US005091941A

United States Patent [19]

Needle et al.

[11] Patent Number: 5,091,941

[45] Date of Patent: Feb. 25, 1992

[54] SECURE VOICE DATA TRANSMISSION SYSTEM

[75] Inventors: David L. Needle, Alameda; Bradley C. Stribling, Danville, both of Calif.

[73] Assignee: Rose Communications, Inc., Santa Clara, Calif.

[21] Appl. No.: 607,988

[22] Filed: Oct. 31, 1990

[51] Int. Cl.[5] .......... H04L 9/00

[52] U.S. Cl. .......... 380/43; 380/49; 380/9

[58] Field of Search .......... 380/43, 49, 9, 2, 8; 324/77 R; 364/827

[56] References Cited

U.S. PATENT DOCUMENTS

| | | | |
|---|---|---|---|
| 4,179,586 | 12/1979 | Matthews et al. | 380/33 |
| 4,658,094 | 4/1987 | Clark | 380/28 |
| 4,972,469 | 11/1990 | Saltwick et al. | 380/2 |
| 5,007,086 | 4/1991 | Shenoi et al. | 380/46 |

*Primary Examiner*—Thomas H. Tarcza
*Assistant Examiner*—David Cain
*Attorney, Agent, or Firm*—Blakely, Sokoloff, Taylor & Zafman

[57] ABSTRACT

In the secure radio transmission system of the present invention the sign bit for each byte of audio digital data is scrambled to generate a scrambled sign bit. By altering the sign bit, the resultant sound is significantly affected regardless of the amplitude range of the source audio. A key is stored in each authorized radio transmitter/receiver telephone. The key is used to select the bits of the digital voice data to be transmitted which are used to scramble the sign bit. The selected bits of the voice data are then used to scramble the sign bit and the voice data with the scrambled sign bit are transmitted to the receiving device. The receiving device executes the reverse process wherein the receiving device selects predetermined bits of the received voice data according to the key stored in the receiving device and scrambles the scrambled sign bit using the same algorithm in accordance with the data bits selected. This process generates the unscrambled sign bit and unscrambled voice data is generated at the output of the receiving device.

9 Claims, 3 Drawing Sheets

SECURE VOICE DATA TRANSMISSION SYSTEM

BACKGROUND OF THE INVENTION

1. Field of the Invention

The system of the present invention relates to the security of radio telephones. More specifically, the system of the present invention relates to the scrambling of radio transmitted message data transmitted to prevent the accidental or deliberate eavesdropping of voice communications.

2. Art Background

In today's mobile environment, radio telephones, which connect to central office lines via radio waves, are widely used. However, voice communications through radio telephones are by their nature unsecure. A radio telephone that is set to an active channel or frequency, which is already in use by another party using another radio telephone, will hear the voice activity on that channel. Thus, it is quite easy and often common in certain environments to be able to hear other conversations when using the radio telephone. This is not desirable for purposes of privacy. Furthermore, an unsecured system is unacceptable for a business system which consists of radio telephones.

Existing techniques implemented for scrambling voice data to protect against intentional or unintentional "eavesdropping" employ scrambling or encription algorithms which alter all or a majority of the data bits representing the voice data. Attempts at altering a limited number of the voice data bits have not achieved good results and alteration of the least significant data bit is virtually unnoticeable to the listener. Similarly alteration of the two least significant bits may be noticed by the listener but the voice transmission is still understandable or intelligible. Altering the third and fourth least significant bits causes noticeable changes in the voice sounds, but the listener is still able to comprehend the basic communication. Alteration of the high order bits has a significantly larger impact on the voice sound, but the impact only affects the intelligibility of the sound if the original sound contains amplitude code components in that range (that is, low volume speech will be altered but understandable). Altering a combination of these bits will in many cases cause the sound to be unintelligible; however, in many cases the listener will still be able to discern the content of the speech. In addition, the hardware and software required to manipulate the bits and produce effective scrambling is typically too large and computation intensive for a cellular or cordless handset, particularly because the scrambling must be performed for each byte of voice data.

SUMMARY OF THE INVENTION

It is therefore an object of the present invention to provide a secure radio telephone system which scrambles data simply and quickly such that there is no delay in transmission or audible degradation to the user.

It is an object of the present invention to provide a simple technique for scrambling audio data to prevent the eavesdropping of radio communications which fits compactly into a radio handset.

In the secure radio transmission system of the present invention the sign bit for each byte of audio digital data is scrambled to generate a scrambled sign bit. By altering the sign bit, the resultant sound is significantly affected regardless of the amplitude range of the source audio. A key is stored in each authorized radio transmitter/receiver telephone. The key is used to select the bits of the digital voice data to be transmitted which are used to scramble the sign bit. The selected bits of the voice data are then used to scramble the sign bit and the voice data with the scrambled sign bit are transmitted to the receiving device. The receiving device executes the reverse process wherein the receiving device selects predetermined bits of the received voice data according to the key stored in the receiving device and scrambles the scrambled sign bit using the same algorithm in accordance with the data bits selected. This process generates the unscrambled sign bit and unscrambled voice data is generated at the output of the receiving device.

BRIEF DESCRIPTION OF THE DRAWINGS

The objects, features and advantages of the system of the present invention will be apparent from the following description of the invention in which.

DETAILED DESCRIPTION OF THE INVENTION

The system of the present invention provides a technique for insuring the security of transmissions over radio links by scrambling the data to be transmitted and de-scrambling the transmitted data in a real time manner that is transparent to the user. It has been found by scrambling only the sign bit in random or semi-random manner significantly distorts the analog voice signal translated from the digital voice data to render it unintelligible to an eavesdropper who intercepts the transmitted radio signal. The value of the sign bit affects the polarity of the signal and therefore the random reversals of the signal polarity renders the speech unintelligible.

Figure 1:
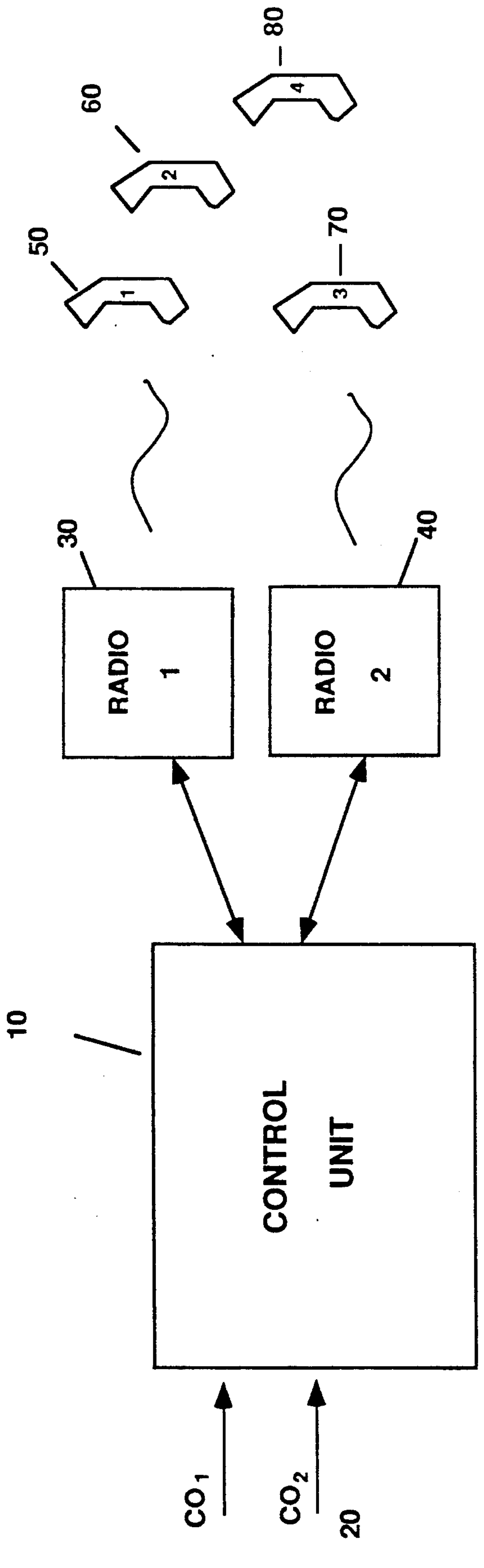
FIG. 1 illustrates an exemplary cordless telephone system which utilizes the secure voice data transmission of the present invention.

The secure voice data transmission system of the present invention may be employed in an exemplary cordless telephone system as shown in FIG. 1. A control unit 10 controls the operation of the system. Central office ("CO") lines 20 are connected to the control unit 10 which then directs the incoming voice data to a radio 30, 40 for transmission to a cordless handset 50, 60, 70, 80 remote from the control unit 10.

If, for example, a handset 50 is communicating with central office line 1 ($CO_1$) 20 through the radio 30 and control unit 10, the secured voice data transmission system of the present invention will prevent handsets 60, 70, and 80, as well as any other proximal handsets, from listening to the voice data transmitted between the radio 30 and the handset 50. Thus the system may be employed in a business environment wherein multiple central office lines are interfaced to a multiplicity of handsets and each ongoing conversation between a handset and the radio of the control unit is secured against intentional or unintentional listening by other handsets. Such a system is described in copending U.S. patent application Ser. No. 07/609,000, entitled "Cordless Radio Telephone System," filed concurrently herewith.

Figure 2:
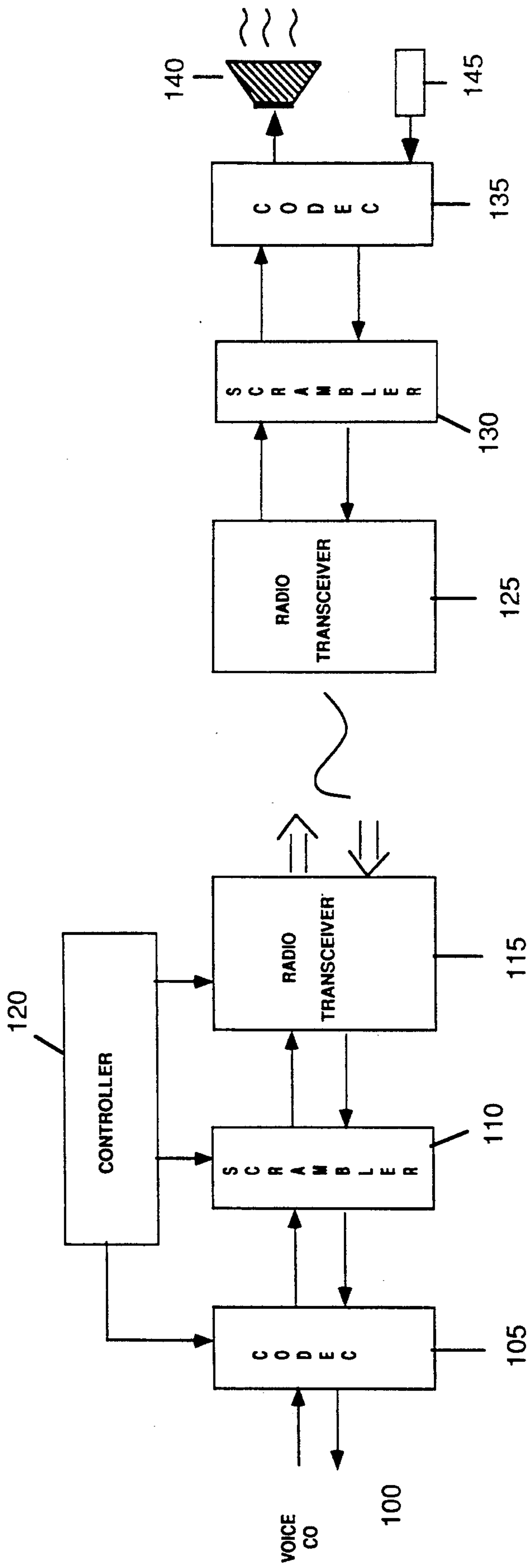
FIG. 2 is a block diagram representation of a preferred embodiment of the present invention.

The secure voice data transmission system of the present invention may be explained with reference to FIG. 2. The incoming voice data from the central office line (CO) connected to the system 100 is input to a CODEC 105 which codes the analog voice data into digital voice data according to well-known digital telephone standards. The output of the CODEC 105 consists of a string of digital samples of the analog voice signal received over the CO line. Each sample is represented by an eight bit value. These eight bit values are input to the scrambler 110 which scrambles the sign bit of the eight bit representation of the voice signal in accordance with a key which is stored in the device and replaces the unscrambled sign bit with the scrambled sign bit. The digital voice data with the scrambled sign bit is input to the radio transceiver 115 which transmits the data to the receiving device, radio transceiver 125. Radio transceiver 125 inputs the received digital voice data to the scrambler 130 which performs the same algorithm using the same key stored in the receiving device to generate the unscrambled sign bit. The digital voice data with the unscrambled sign bit is then input to the CODEC 135 which performs the necessary translation to generate the output analog voice signal, which may then be output to a speaker or other listening type device 140.

Similarly, for a remote device or handset to transmit to another device, the analog voice data detected by through a microphone 145 is input to the CODEC 135 for translation to a digital voice representation. The digital voice data is then input byte by byte to the scrambler 130, which scrambles the sign bit of each byte of voice data. This is output to the radio transceiver 125 which transmit to the radio transceiver of the receiving device 115. The voice data received is input to the scrambler 110 and, in accordance to the key stored in the system, unscrambles the scrambled sign bit and input the bytes of digital voice data with the unscrambled sign bit to the CODEC 105 for conversion to analog voice data for transmission to the CO line 100.

Preferably the system includes a controller 120 to control the operation of the system including the allocation of channels and the assignment of keys to the radio handsets to be operated with the system. The key that is stored in each device is pre-stored in the system. The key may be permanently stored in the system (i.e. the key is hard-wired into the system). Preferably the key is separately transmitted, prior to voice data transmission, from the master or host device for storage in memory in the remote device, for example, the handset. In addition, for added security it is preferred that the system can change the key during voice transmission by simply transmitting a new key to the remote device. This key would then replace the key stored in memory or wired in the system. Preferably the key is a two part key, wherein a unique key or identifier exists for each remote device (handset) that may operate with the host or master control device and is combined with a second key transmitted by the host device to generate the key used to scramble the sign bit. Thus, each device is further secured from the other remote devices in the system. Preferably this is achieved by providing a unique identification number for each handset.

The resulting key to be used to scramble and unscramble the sign bit is the result of the combination of the handset identifier and the preliminary key stored in the handset and the controller. For example, the handset identification number and key may be summed, multiplied or concatenated to produce the resultant key. Furthermore, the preliminary key that is stored in the controller and sent to the handset prior to any voice data transmission may be reset at any time to a new value thereby providing further security to the system. The new key may be transmitted via the radio transceiver links through a transmission not associated with any voice data. Once the new key is stored in the handset and the master device, voice transmission may be resumed using the new key.

Figure 3:
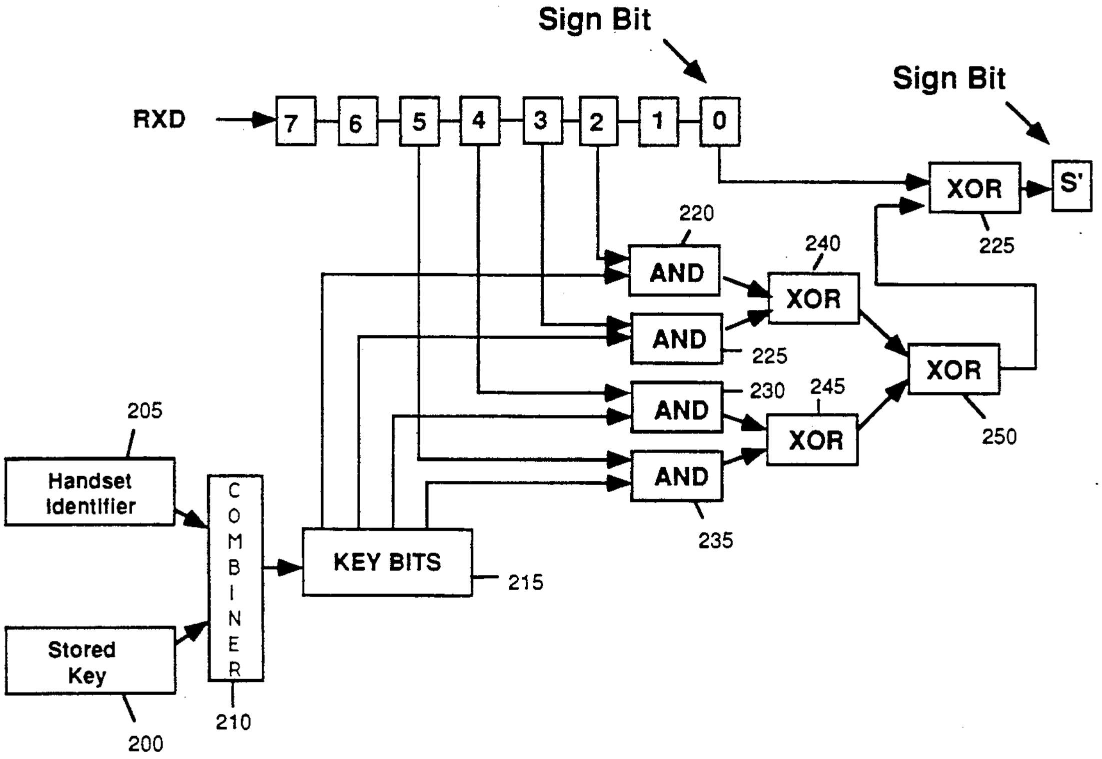
FIG. 3 illustrates the scrambling process and structure of the preferred embodiment of the present invention.

A preferred embodiment of the scrambling process is illustrated with reference to FIG. 3. A stored key 200 and handset identifier 205 is combined by combiner 210 to generate a four bit key 215. This four bit key is used to select the bits of the received voice data that are to be used to scramble the sign bit. In this illustration, voice data bits 5, 4, 3, and 2 are input to AND gates 220, 225, 230 and 235. Key bits 0 to 3 are similarly input to AND gates 220, 225, 230 and 235. The output values of the AND gates 220 and 225 are input to an EXCLUSIVE OR gate 240 and the output values of AND gates 230 and 235 are input to an EXCLUSIVE OR gate 245. The output of the EXCLUSIVE OR gates 240, 245 are input to a third EXCLUSIVE OR gate 250 to generate the output value which is input to EXCLUSIVE OR gate 255. The other input to EXCLUSIVE OR gate 255 is the unscrambled sign bit. The output of the EXCLUSIVE OR gate 255 is the scrambled sign bit which replaces the unscrambled sign bit prior to transmission through the radio transceiver.

The process the receiving device executes for unscrambling the sign bit is the same process used to scramble the sign bit in the transmitting device because the EXCLUSIVE OR gate 255 used to scramble the sign bit acts as a "toggle" to change the sign bit between zero and one digital values. It may be seen that a percentage of the time the scrambling process will produce an output sign bit, which is the same value as the unscrambled sign bit. However, it has been found that the percentage of scrambled sign bits which are different from the unscrambled sign bits are such to significantly affect the resultant voice transmission and results in a voice transmission which is unintelligible and undecipherable by an inadvertent or intentional listener.

Through the system of the present invention, real time scrambling and unscrambling of voice data is accomplished to provide a secure transmission of voice data between radio links which is simple and inexpensive to implement and can be easily incorporated into the small cordless handsets frequently used. While the invention has been described in conjunction with the preferred embodiment, it is evident that numerous alternatives, modifications, variations and uses will be apparent for those skilled in the art in light of the foregoing description.

What is claimed is:

1. In a digital voice radio transmission system comprising a first transceiver and a second transceiver, said second transceiver being remote from the first transceiver and connected through the transmission of radio signals representative of digital voice data, a method for securing the digital voice data transmitted through the radio links from the first transceiver to the second transceiver, comprising the steps of:

translating the analog voice data to digital voice data, said digital voice data comprising at least one sign bit;

scrambling the sign bit;

replacing the sign bit with the scrambled sign bit;

transmitting the digital voice data with the scrambled sign bit from the first transceiver to the second transceiver;

upon receipt of said transmitted digital voice data, said second transceiver;

unscrambling said sign bit, replacing the scrambled sign bit with the unscrambled sign bit, and translating the digital voice data with the unscrambled sign bit to analog voice data whereby the analog voice data is output to a speaker for listening by a user of the second transceiver.

2. The digital voice radio transmission system as set forth in claim 1, wherein said step of scrambling the sign bit and unscrambling the sign bit is performed in accordance with a key.

3. The digital voice radio transmission system as set forth in claim 2, wherein the key is stored in the first transceiver and second transceiver.

4. The digital voice radio transmission system as set forth in claim 3, wherein the key is transmitted from the first transceiver to the second transceiver and stored in the second transceiver prior to transmission of voice data.

5. The digital voice radio transmission system as set forth in claim 2, wherein said key is changeable during transmission of voice data by separately transmitting the key from the first transceiver to the second transceiver where it is stored in the second transceiver.

6. The digital voice radio transmission system as set forth in claim 2, wherein said key comprises two sub-keys, said first sub-key being a unique device identifier which identifies the second transceiver and the first key being an arbitrary value predetermined by the first transceiver, said first sub-key and second sub-key being combined to form the key used to scramble the sign bit.

7. The digital voice radio transmission system as set forth in claim 2, wherein at least a portion of the bits of voice data transmitted is used to scramble the sign bit, said key being used to select the bits of the voice data which are used to scramble the sign bit.

8. In a digital voice radio transmission comprising a first transceiver and a second transceiver, said second transceiver being remote from the first transceiver and connected through the transmission of radio signals representative of digital voice data, a method for securing the digital voice data transmitted through the radio links from the first transceiver to the second transceiver, said method comprising the steps of:

providing a first sub-key and second sub-key to the first transceiver and second transceiver, said first sub-key being a unique device identifier which identifies the second transceiver, said second sub-key comprising a predetermined value;

combining said first sub-key and said second sub-key to generate a key;

translating the analog voice data to digital voice data, said digital voice data comprising at least one sign bit;

selecting bits of the digital voice data to be transmitted in accordance with said key;

scrambling the sign bit in accordance with the selected bits of the digital voice data;

replacing the sign bit with the scrambled sign bit;

transmitting the digital voice data with the scrambled sign bit from the first transceiver to the second transceiver;

upon receipt of said transmitted digital voice data, said second transceiver;

combining the first sub-key and second sub-key to produce a key, selecting bits of the received digital voice data in accordance with said key;

unscrambling the sign bit in accordance with the selected bits of the transmitted digital voice data;

replacing the scrambled sign bit with the unscrambled sign bit;

translating the digital voice data with the unscrambled sign bit to analog voice data, whereby the analog voice data is output to a speaker for listening by a user of the second receiver.

9. The digital voice radio transmission system comprising a first transceiver and second transceiver, said second transceiver being remote from the first transceiver and connected through the transmission of radio signals representative of digital voice data, an apparatus for securing the digital voice data transmitted through the radio links from the transceiver to the second transceiver comprising:

a first translating means located in the first transceiver for translating the analog voice data to digital voice data, said digital voice data comprising at least one sign bit;

a first scrambling means connected to the first translating means for scrambling the sign bit to generate an unscrambled sign bit, a first replacement means connected to the output of the first scrambling means for replacing the scrambled sign bit with the unscrambled sign bit;

radio transmission means connected to receive the digital voice data and scrambled sign bit for transmitting the digital voice data with the scrambled sign bit from the first transceiver to the second transceiver;

radio receiving means located in the second transceiver for receiving the transmitted digital voice data with the scrambled sign bit;

a second scrambling means connected to the radio receiving means for unscrambling the scrambled sign bit;

a second replacement means connected to the second scrambling means for replacing the unscrambled sign bit with the scrambled sign bit; and a second translating means connected to receive the voice data and unscrambled sign bit for translating the digital voice data to analog voice data for output to a speaker device for listening by a user of the second receiver.

* * * * *